United States Patent
Aposhian et al.

(10) Patent No.: US 9,363,937 B2
(45) Date of Patent: Jun. 14, 2016

(54) REMOVING SOD FROM A STACKING CONVEYOR

(71) Applicants: Steven R. Aposhian, Farmington, UT (US); Eric E. Aston, Farmington, UT (US); William M. Decker, Salt Lake City, UT (US); Samuel Drake, Cottonwood Heights, UT (US)

(72) Inventors: Steven R. Aposhian, Farmington, UT (US); Eric E. Aston, Farmington, UT (US); William M. Decker, Salt Lake City, UT (US); Samuel Drake, Cottonwood Heights, UT (US)

(73) Assignee: FIREFLY AUTOMATIX, INC., North Salt Lake, UT (US)

( * ) Notice: Subject to any disclaimer, the term of this patent is extended or adjusted under 35 U.S.C. 154(b) by 11 days.

(21) Appl. No.: 14/303,316

(22) Filed: Jun. 12, 2014

(65) Prior Publication Data
US 2015/0359161 A1 Dec. 17, 2015

(51) Int. Cl.
| | | |
|---|---|---|
| B65B 35/18 | (2006.01) | |
| B65B 5/10 | (2006.01) | |
| A01B 45/04 | (2006.01) | |
| B65G 43/08 | (2006.01) | |
| B65G 47/64 | (2006.01) | |
| B65G 47/31 | (2006.01) | |
| B65B 57/14 | (2006.01) | |
| B65G 47/71 | (2006.01) | |
| B65B 57/16 | (2006.01) | |

(52) U.S. Cl.
CPC .............. *A01B 45/045* (2013.01); *B65B 5/105* (2013.01); *B65B 35/18* (2013.01); *B65B 57/14* (2013.01); *B65G 43/08* (2013.01); *B65G 47/31* (2013.01); *B65G 47/648* (2013.01); *B65G 47/71* (2013.01); *B65B 57/16* (2013.01)

(58) Field of Classification Search
CPC .... B65G 47/086; B65G 57/245; B65G 43/08; B65G 47/31; B65G 2201/0205; B65G 2203/044; B65G 43/10; B65G 47/648; B65G 47/71; B65G 61/00
See application file for complete search history.

(56) References Cited

U.S. PATENT DOCUMENTS

| | | | | | |
|---|---|---|---|---|---|
| 4,852,237 | A * | 8/1989 | Tradt | .................... | B62D 65/06 29/407.04 |
| 5,186,599 | A * | 2/1993 | Fluck | ..................... | B65B 23/14 414/792.9 |
| 6,540,063 | B1 * | 4/2003 | Fallas | ..................... | B65B 5/105 198/419.3 |
| 6,826,444 | B2 * | 11/2004 | Herzog | .................. | B65B 5/105 198/395 |
| 6,934,605 | B1 * | 8/2005 | Dothan | ............ | G05B 19/41815 141/6 |
| 8,074,431 | B1 * | 12/2011 | Pierson | ................ | B65G 47/086 414/791.6 |
| 2005/0075752 | A1 * | 4/2005 | Ban | .................... | G05B 19/4182 700/213 |
| 2005/0246056 | A1 * | 11/2005 | Marks | .................. | B65G 47/086 700/213 |
| 2007/0108109 | A1 * | 5/2007 | Erlandsson-Warvelin | ............... | B25J 9/1694 209/629 |
| 2008/0101911 | A1 * | 5/2008 | Hulchanski | .......... | B65G 57/245 414/793 |
| 2010/0030373 | A1 * | 2/2010 | Lee | ........................ | B65B 35/44 700/223 |
| 2010/0252286 | A1 * | 10/2010 | Brouwer | ................ | A01B 45/04 172/19 |
| 2012/0165972 | A1 * | 6/2012 | Wappling | ............... | B25J 9/1687 700/213 |
| 2012/0319416 | A1 * | 12/2012 | Ellis | .................... | B25J 15/0616 294/183 |

* cited by examiner

*Primary Examiner* — Gregory Adams
(74) *Attorney, Agent, or Firm* — Brian Tucker; Kirton McConkie

(57) ABSTRACT

Sod harvester stacking head and stacking conveyor configurations can increase the rate at which sod can be harvested. The movement of the stacking head and/or the stacking conveyor can be controlled to maximize the rate at which the stacking head can remove sod from the stacking conveyor. A stacking head can employ multiple pick up positions. A stacking conveyor may also advance sod for pick up at varying rates. A stacking head may include a pivoting connection to allow the stacking head to rotate around a pivot during a pick up operation.

16 Claims, 9 Drawing Sheets

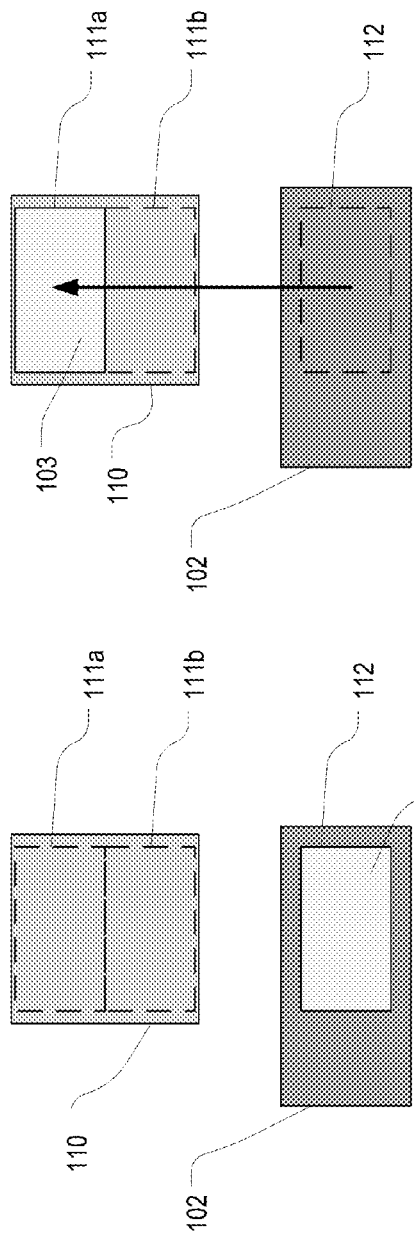
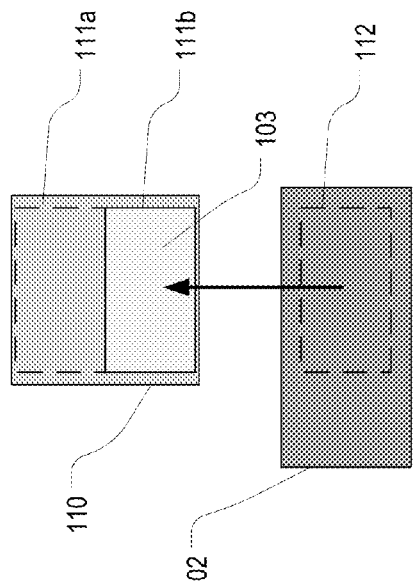
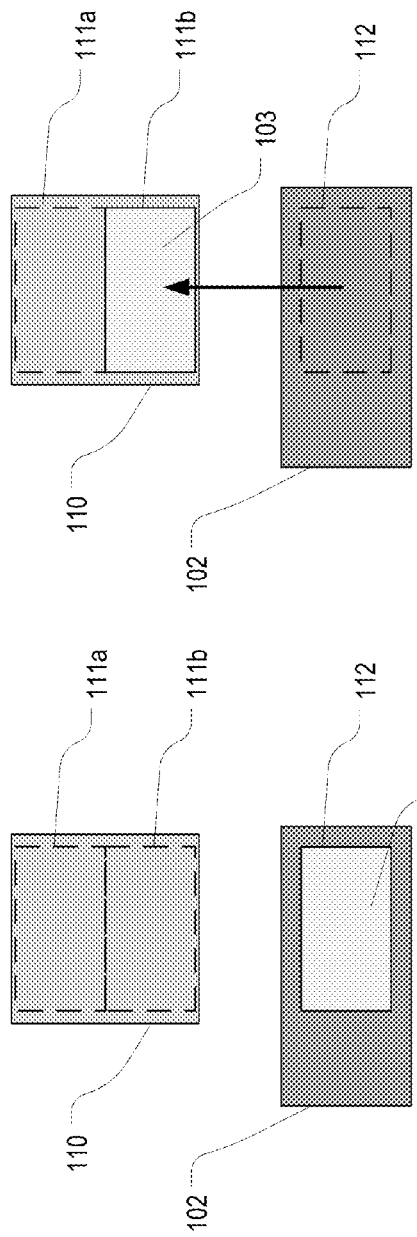
FIG. 1A  FIG. 1B  FIG. 1C  FIG. 1D

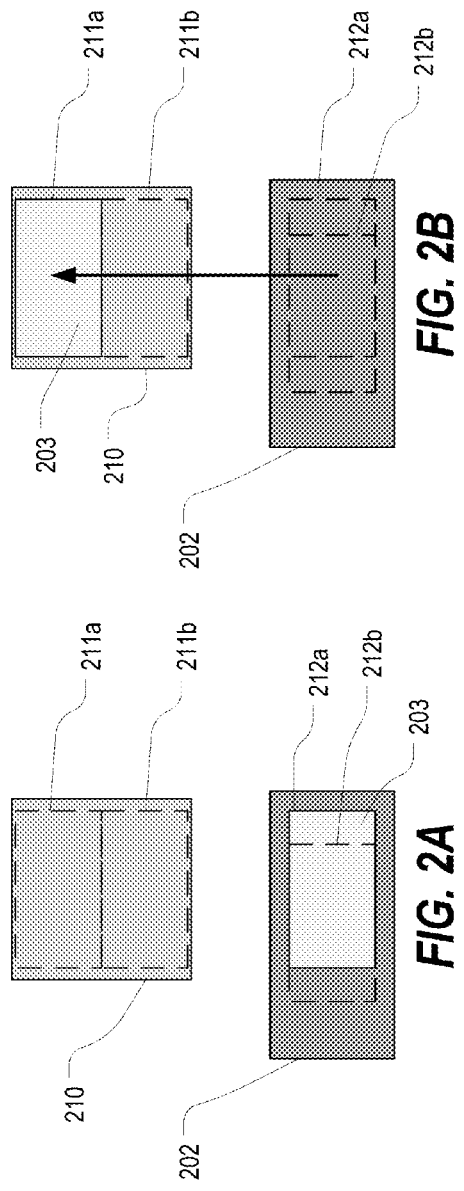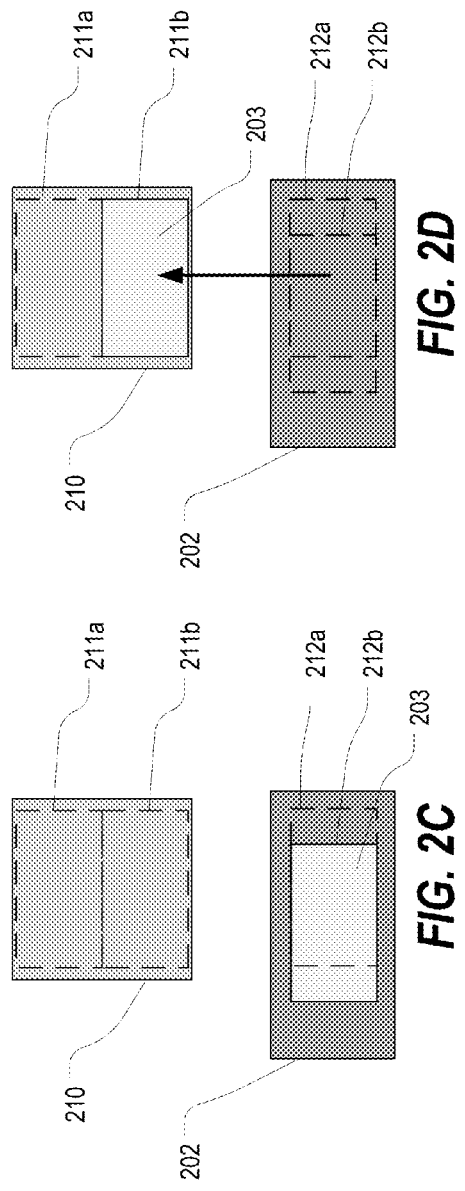

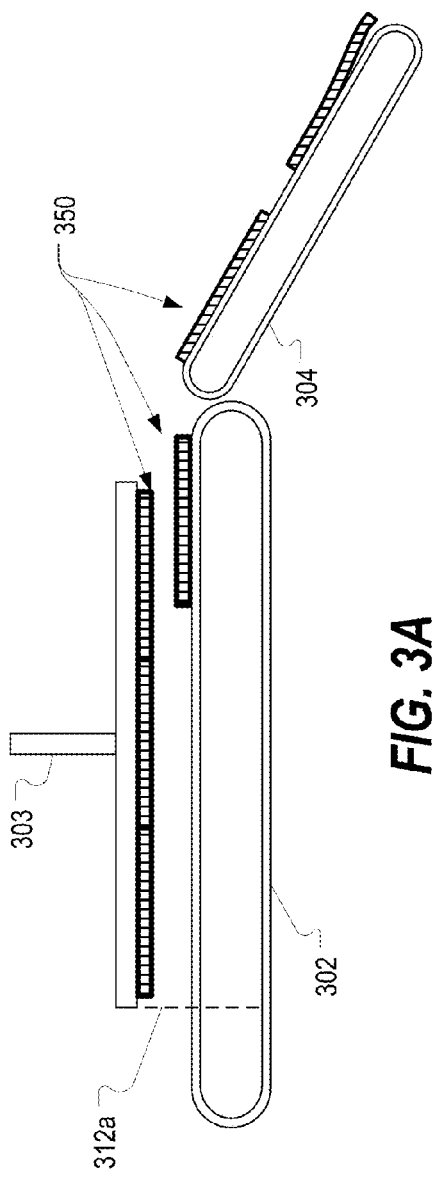
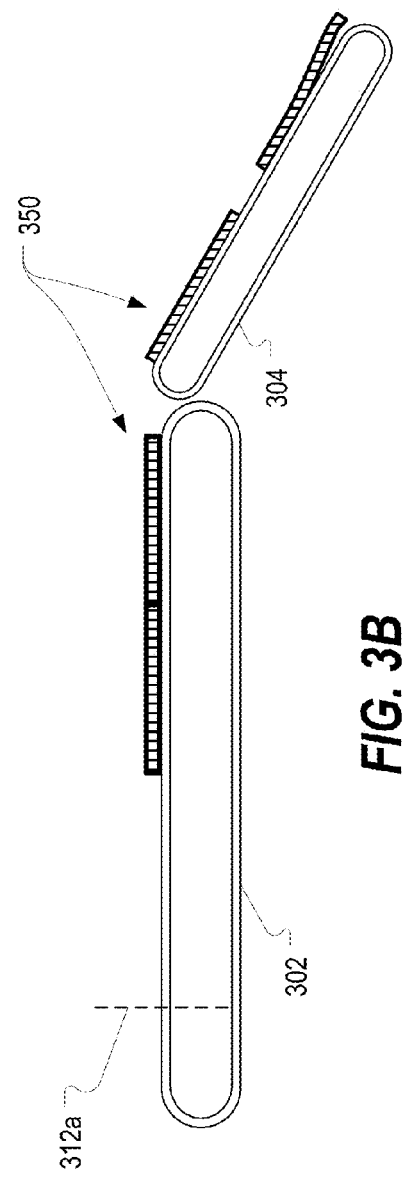
FIG. 3A
FIG. 3B

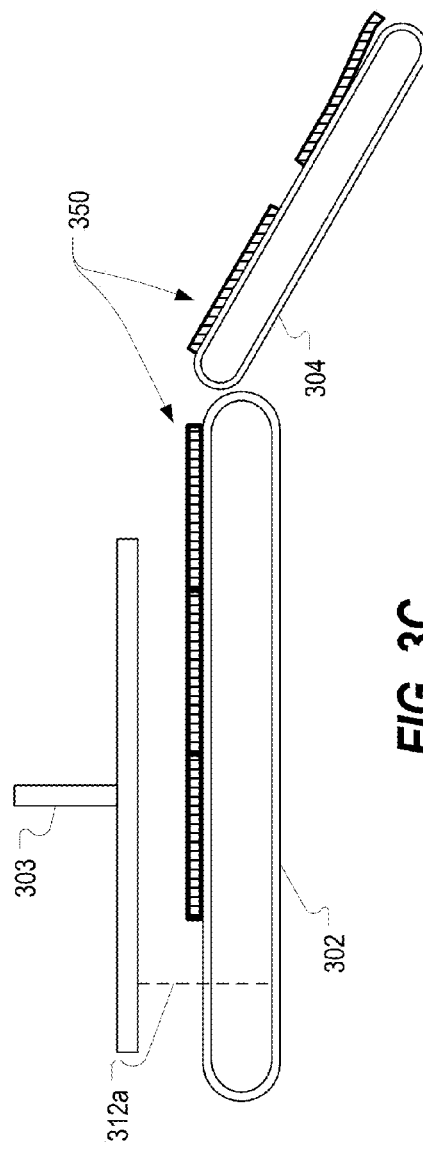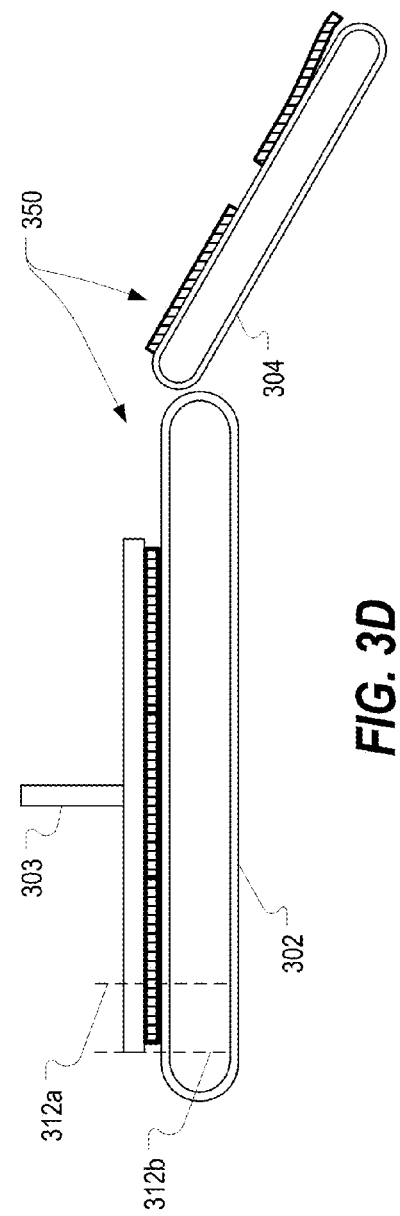

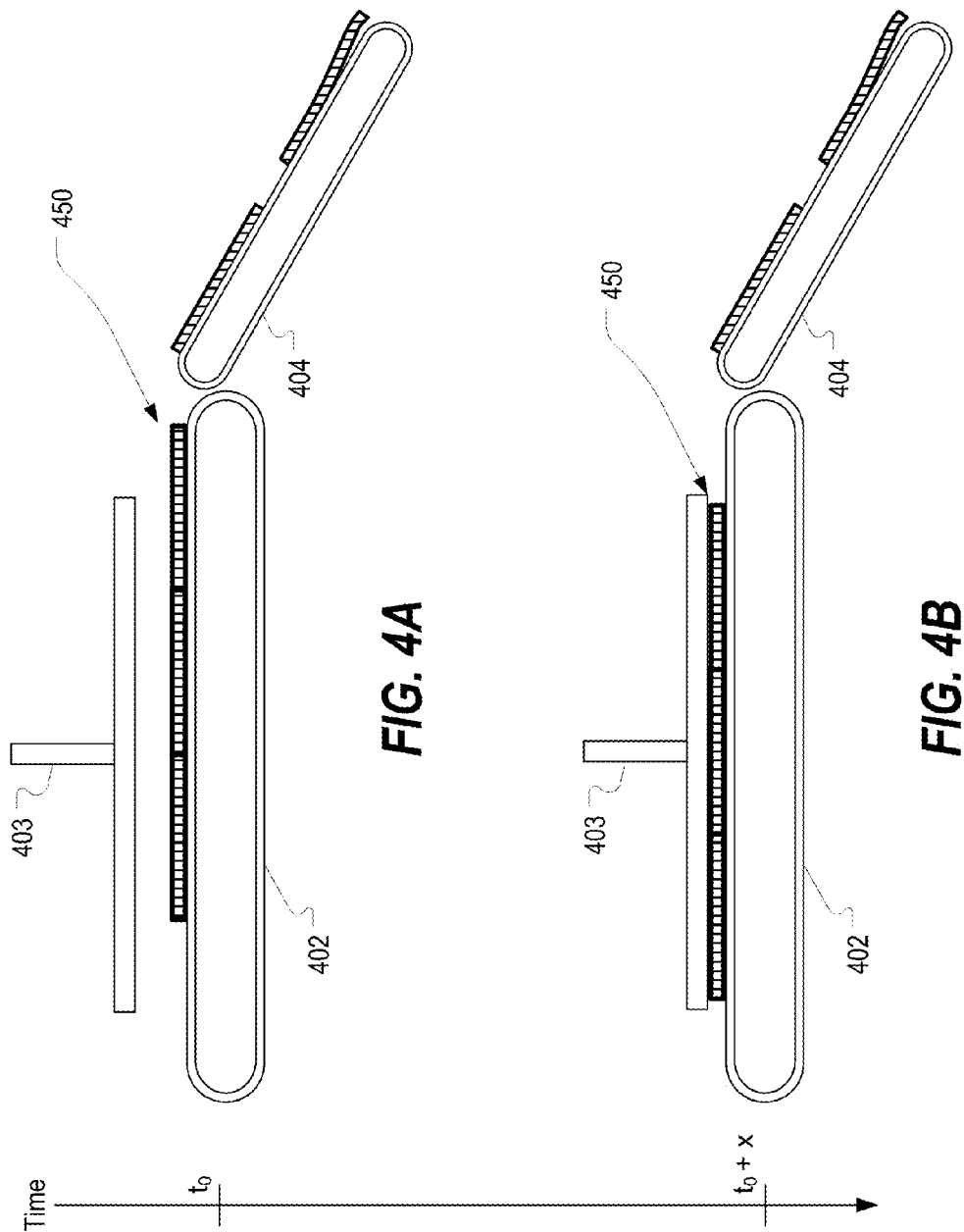

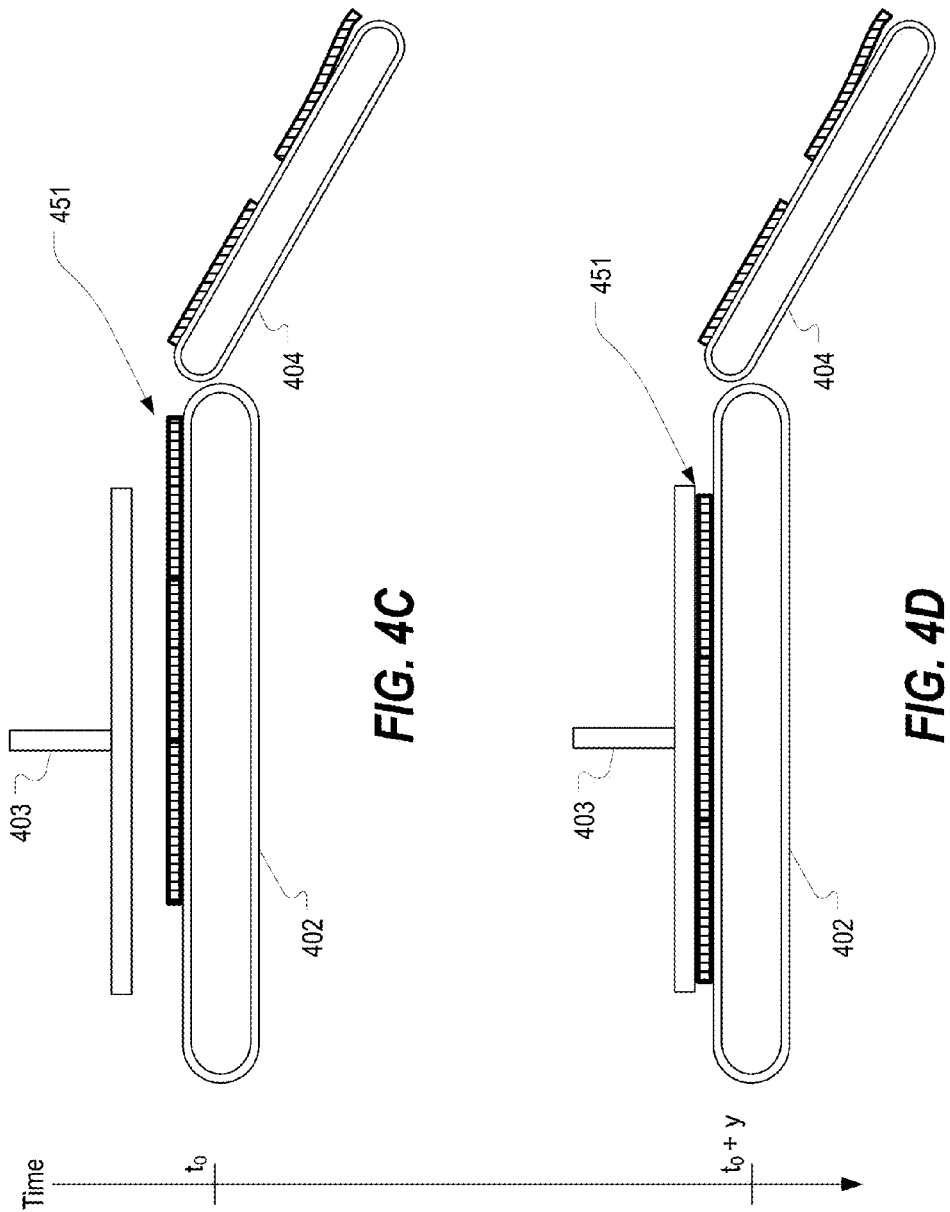

REMOVING SOD FROM A STACKING CONVEYOR

CROSS-REFERENCE TO RELATED APPLICATIONS

This application is related to U.S. patent application Ser. No. 13/851,418 (the '418 application), titled Electrically Operated Turf Stacking System For Sod Harvesting Machine, which was filed on Mar. 27, 2013 and is incorporated herein by reference. The '418 application describes a stacking head that is suitable for use in implementing some embodiments of the present invention.

This application is also related to U.S. patent application Ser. No. 13/851,402 (the '402 application), titled Conveyor System For Controlling Spacing Between Sod Slabs, which was filed on Mar. 27, 2013 and is incorporated herein by reference. The '402 application describes a conveyor system that can be used in some embodiments of the present invention.

BACKGROUND

Turf grass (sod) is a living organism that must be handled properly to ensure its survival when it is removed from one location and transplanted to another. Sod is generally harvested using large machinery that cuts slabs of sod from the soil. Typically, a sod harvester employs one or more inclined conveyors to elevate the sod from the ground to a horizontal conveyor. A stacking head is then used to pick up the sod from the horizontal conveyor and stack it on a pallet.

Two general types of harvesters exist: slab harvesters; and roll harvesters. A roll harvester forms the slabs of sod into rolls which are then accumulated on the horizontal conveyor for pick up. A slab harvester, on the other hand, directly stacks the slabs in their flat form. With either type of harvester, the speed at which the harvester can remove sod from the horizontal conveyor and stack it oftentimes is the controlling factor that determines how fast the harvester can operate.

BRIEF SUMMARY

The present invention extends to sod harvester stacking head and stacking conveyor configurations as well as to systems, methods, and computer program products configured to control the movement of the stacking head and stacking conveyor of a sod harvester. The movement of the stacking head and/or the stacking conveyor can be controlled to maximize the rate at which the stacking head can remove sod from the stacking conveyor. By maximizing this rate, a sod harvester can be operated at increased speeds to produce higher yields.

In one embodiment, the present invention is implemented as a sod harvester that comprises a stacking conveyor configured to support one or more slabs of sod prior to a stacking operation. The stacking conveyor is configured to rotate in a first direction to advance the one or more slabs of sod. The sod harvester also comprises a stacking head configured to remove the one or more slabs of sod from the stacking conveyor as part of a stacking operation. The stacking head is configured to be positioned at at least two pick up positions overtop the stacking conveyor with a first pick up position being closer to a front of the stacking conveyor than a second pick up position.

In another embodiment, the present invention is implemented as a sod harvester that comprises a stacking conveyor configured to support one or more slabs of sod prior to a stacking operation. The stacking conveyor is configured to rotate in a first direction to advance the one or more slabs of sod to a pick up position. The sod harvester also comprises a stacking head configured to remove the one or more slabs of sod from the stacking conveyor at the pick up position as part of a stacking operation and to stack the one or more slabs of sod at one of at least two stacking positions. The stacking conveyor is configured to advance the one or more slabs of sod to the pick up position at a rate that is based on a particular stacking position at which the one or more slabs will be stacked.

In another embodiment, the present invention is implemented as a method of operating a stacking head of a sod harvester. The stacking head is configured to remove sod from a stacking conveyor in at least a first and a second pick up position and to stack the sod in at least a first and a second stacking position. The stacking head is positioned at the first pick up position to enable the stacking head to remove one or more slabs of sod from the stacking conveyor. The stacking head is then moved from the first pick up position to the second stacking position to enable the stacking head to stack the one or more slabs. The stacking head is then positioned at the second pick up position to enable the stacking head to remove another one or more slabs of sod from the stacking conveyor. Then, the stacking head is moved from the second pick up position to the first stacking position to enable the stacking head to stack the other one or more slabs.

In another embodiment, the present invention is implemented as stacking head of a sod harvester that comprises a main body portion, a sod securing portion configured to remove sod from a stacking conveyor, and at least one arm that secures the sod securing portion to the main body portion via a pivoting connection. The sod securing portion is configured to rotate from a first position to a second position around the pivoting connection and to remove the sod from the stacking conveyor during the rotation from the first position to the second position.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1A-1D illustrate a series of movements of a stacking head between a pick up position and two different stacking positions;

FIGS. 2A-2D illustrate a series of movements of a stacking head between two different pick up positions and two different stacking positions;

FIGS. 3A-3D illustrate how a stacking head can be positioned at two different pick up positions;

FIGS. 4A-4D illustrate how a stacking conveyor can advance sod at different rates depending on the stacking position where the sod will be stacked.

DETAILED DESCRIPTION

Figure 5A:
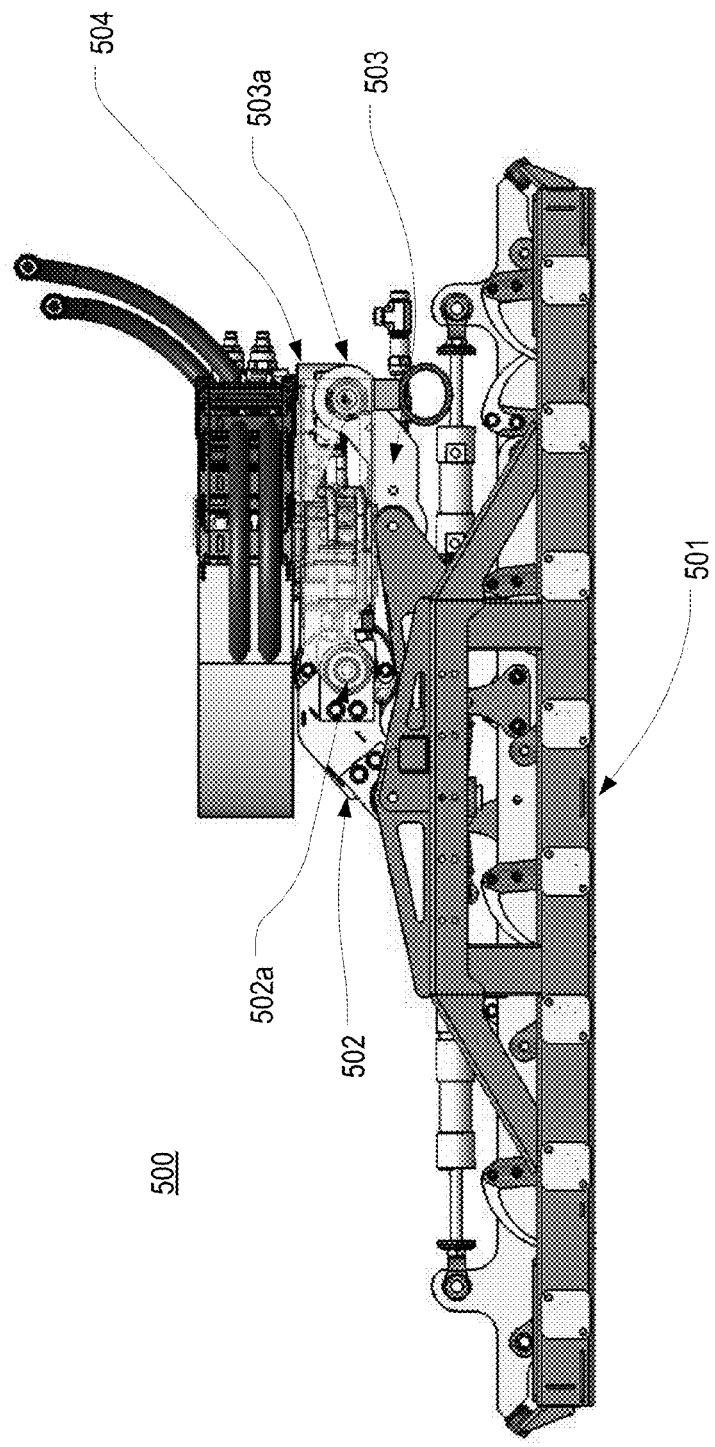
FIGS. 5A-5C illustrate a pivoting stacking head in three different positions.

In this specification, a stacking head refers to the mechanism of a sod harvester that picks up sod and stacks it, whether the sod is in slabs or in rolls. The manner in which the stacking head picks up the sod is not essential to the invention. For example, the stacking head may descend to a stacking conveyor to pick up the sod, or the stacking conveyor may be lifted to elevate the sod towards the stacking head. Further, in some implementations, the stacking head may descend and the stacking conveyor may be lifted.

Also, in this specification, a stacking head can employ many different types of structures and/or techniques for securing the sod. For example, a stacking head can include pivoting clamps that grab the sod (e.g. on opposite sides of a roll or by squeezing the blades of a slab), extending blades or sharp implements that pierce through the sod (e.g. nails that extend into opposing sides of a roll or that extend through slabs at an angle), etc. Accordingly, a stacking head should not be construed as having any particular structure for securing sod to the stacking head during a stacking operation.

Further, in this specification, a stacking conveyor should be construed as any conveyor from which the stacking head picks up sod whether the sod is in slabs or in rolls. Although the figures illustrate a stacking conveyor that is horizontal, a stacking conveyor should also be construed as including conveyors that are inclined in any direction as long as the stacking head removes sod from the conveyor as part of a stacking operation.

A pick up position refers generally to the relative position of the stacking head with respect to the stacking conveyor when the stacking head removes sod from the stacking conveyor. A stacking position refers generally to the relative position of the stacking head with respect to a pallet (or other support structure) when the stacking head releases sod onto the pallet for stacking.

The present invention is directed to various techniques that can be employed on a sod harvester to improve pick up and stacking operations. In many cases, these techniques can be employed to enable the sod harvester to operate at higher speeds thereby increasing the rate at which sod is harvested.

These techniques include employing multiple pick up positions and operating the stacking conveyor at variable speeds. In either case, the technique can be based on the fact that it may require different amounts of time to return the stacking head to a pick up position based on the previous stacking position.

FIGS. 1A-1D provide a series of top views of a sod harvester to illustrate how a sod harvester may employ multiple stacking positions. In each of FIGS. 1A-1D, a stacking conveyor 102, a stacking head 103, and a pallet 110 is depicted with stacking head 103 moving between a pick up position 112 (represented by the dashed box over stacking conveyor 103) and two different stacking positions 111a and 111b (represented by the dashed boxes over pallet 110). In these figures, it is assumed that sod travels from right to left on stacking conveyor 102. The arrows represent the movement of stacking head 103 from pick up position 112 depicted in FIGS. 1A and 1C to stacking positions 111a and 111b depicted in FIGS. 1B and 1D respectively. After stacking sod in each of stacking positions 111a and 111b, stacking head 103 can return to pick up position 112 to pick up more sod. Because stacking position 111a is farther from pick up position 112 than stacking position 111b, it can require a greater amount of time for stacking head 103 to travel to stacking position 111a than to stacking position 111b.

Although FIGS. 1A-1D depict only two stacking positions, a stacking head may be configured to stack sod in more than two stacking positions. For example, the '418 application describes a stacking head that can rotate in an r axis to enable stacking in at least four different stacking positions. The techniques described below can be employed when any number of stacking positions are used.

The amount of time required for the stacking head to travel from pick up position 112 to stacking position 111b and then return to pick up position 112 will be referred to as $T_1$. The amount of time required for the stacking head to travel from pick up position 112 to stacking position 111a and then return to pick up position 112 will be referred to as $T_2$. Therefore, $T_2$ is greater than $T_1$. This may be the case even if stacking head 103 is moved more quickly when travelling to stacking position 111a.

The rate at which sod is positioned for pick up will be referred to as $T_3$. For example, the sod harvester can be operated at a speed that causes sod to be ready for pick up every $T_3$ seconds. The maximum value for $T_3$ is determined by $T_2$. In other words, the sod harvester cannot be operated at a rate that would cause sod to reach pick up position 112 before stacking head 103 is ready to pick up the sod. Otherwise, stacking conveyor 102 may have to be stopped (or otherwise slowed) to wait for stacking head 103. Slowing stacking conveyor 102 typically will also require slowing or stopping the inclined conveyor that feeds sod to the stacking conveyor. $T_2$ therefore is a primary factor in determining how fast a sod harvester can be operated.

For example, if $T_1$ is 2 seconds and $T_2$ is 3 seconds, $T_3$ at best can be set to 3 seconds. In this example, the sod harvester would therefore be operated at a rate that causes sod to be ready for pick up (e.g. positioned at pick up position 112) every 3 seconds. Therefore, each two stacking operations will be completed in 6 seconds at best even though the stacking head is capable of completing two stacking operations in 5 seconds. This time for completing two stacking operations will be referred to as $2T_3$. To summarize, the present invention is directed to various techniques for minimizing the total time required to perform two stacking operations (i.e. minimizing $2T_3$) so that a sod harvester can produce sod at a quicker rate.

Employing Multiple Pick Up Positions

In accordance with one or more embodiments of the present invention, a stacking head of a sod harvester can be configured to move between two or more different pick up positions. For example, a stacking head can be configured to return to a pick up position that is further back from the front of the stacking conveyor thereby increasing the amount of time that the stacking head can take to return to a pick up position. The use of multiple pick up positions can increase the overall rate at which sod can be removed from the stacking conveyor.

FIGS. 2A-2D illustrate a series of top views of a sod harvester 200 that are similar to FIGS. 1A-1D except that stacking head 203 employs two stacking positions 212a and 212b. It will be assumed that position 212a is the same as position 112.

By employing two stacking positions, stacking conveyor 202 may be allowed to operate at a slightly faster rate. In particular, using two pick up positions may not alter times $T_1$ or $T_2$ as described above because stacking head 203 may move back and forth at the same rate regardless of which pick up position it is moving to. However, by moving stacking head 203 backwards to pick up position 212b, the value of $T_3$ can remain the same for one stacking operation, but be reduced for the other stacking operation.

As described above T3 represents the time required to position sod at position 212a (or 112). However, when stacking head is picking up from pick up position 212b, stacking conveyor 202 must advance sod the additional distance to position 212b making $T_3$ higher in such cases. $T_3$ for such cases may be equal to the normal $T_3$ described above (i.e. set to the value of $T_2$). As a result, $T_3$ will be lower when positioning sod at pick up position 212a because it requires advancing stacking conveyor 202 a shorter distance. These different values for $T_3$ will be referred to as $T_{3a}$ and $T_{3b}$ respectively. The total time for performing two stacking operations will therefore be $T_{3a}+T_{3b}$. Because $T_{3a}$ can be equal to $T_2$, while $T_{3b}$ can be lower than $T_2$, $T_{3a}+T_{3b}$ can be lower than $2T_3$.

This movement from position 212a to position 212b can occur at any time while stacking head travels from overtop pallet 210 to overtop stacking conveyor 202. For example, with respect to the orientation of FIGS. 2A-2D, stacking head 203 can move downward and leftward at the same time after stacking sod on pallet 210. This simultaneous movement in both directions will allow stacking head 203 to reach position 212b in the same amount of time as it would take to reach 212a. The leftward movement may also occur while stacking head 203 is descending and/or while stacking conveyor 202 is ascending for pick up of sod.

In some embodiments, pick up positions 212a and/or 212b can be fixed or may be dynamically determined. In some embodiments, pick up positions 212a and/or 212b can be calculated dynamically based on an estimated time when sod will be ready for pick up. For example, the amount of time required to stack sod may not always be the same. In such cases, the sod harvester can include functionality for determining where the most optimal pick up position may be and cause stacking head 203 to move to that position. If stacking head 203 can return to pick up position 212a in time to pick up the sod, it may do so. However, if moving stacking head 203 to pick up position 212b may allow for more efficient operation (e.g. by not slowing or stopping stacking conveyor 202), it may do so including, in some cases, calculating the most optimal position for pick up position 212b.

FIGS. 3A-3D provide an example of how multiple pick up positions can be employed in an implementation that accumulates multiple slabs of sod 350 on a stacking conveyor 302 prior to being picked up by a stacking head 303. A suitable process for accumulating slabs of sod on stacking conveyor 302 is disclosed in the '402 application which is incorporated by reference.

As more thoroughly described in the '402 application and as represented in FIGS. 3A-3D, stacking conveyor 302 can be configured to accumulate a number of slabs of sod 350 near a front end of stacking conveyor 302. In this example, three slabs are accumulated, although any other suitable number could be accumulated for pick up. Also, the techniques of the present invention could be used when a single slab is picked up.

Once the appropriate number of slabs has been accumulated at the front end of stacking conveyor 302, stacking conveyor 302 is advanced to cause the accumulated slabs to be positioned under stacking head 303 at an appropriate pick up position. FIG. 3A represents the moment when stacking head 303 has just picked up slabs while positioned at a first pick up position 312a. To represent that stacking head 303 has travelled to a stacking position to stack the sod, FIG. 3B does not show stacking head 303. FIG. 3B also shows that slabs of sod 350 are again being accumulated on stacking conveyor 302.

FIG. 3C represents that three slabs of sod 350 have again been accumulated and are being advanced into an appropriate pick up position on stacking conveyor 302. FIG. 3C represents a case where stacking head 303 is moved backwards to allow pick up from a second pick up position 312b. As described above, this movement to pick up position 312b may occur for various reasons including to account for a larger distance that stacking head 303 must travel to stack the sod that was picked up in FIG. 3A.

FIG. 3D illustrates that stacking head 303 has descended to stacking conveyor 302 to pick up sod in the second pick up position 312b. After stacking the sod, stacking head 302 may return to pick up position 312a such as if stacking head will only have to travel to a nearer stacking position to stack the sod.

Typically, stacking conveyor 302 is not stopped while stacking head 303 removes the slabs from stacking conveyor 302. Because of this, stacking head 303 must be in an appropriate pick up position at the correct time to allow stacking head 303 to secure the slabs of sod and remove them from stacking conveyor 302. As stated above, in some embodiments, the appropriate pick up position can be dynamically determined based on where the slabs to be picked up will be when the stacking head 303 can reach a pick up position. In other words, the distance that stacking head 303 should be moved backwards can be determined based on at least two factors: (1) the speed at which stacking conveyor 302 is moving; and (2) the amount of time it will take to position stacking head 303 at an appropriate pick up position.

By allowing stacking head 303 to be moved backwards to a different pick up position, stacking conveyor 302 can be advanced at a rate even if that rate will cause the slabs to be advanced beyond the normal pick-up position. In some cases, the rate at which stacking conveyor 302 is advanced can be based on the need to advance a subsequent slab onto stacking conveyor 303 from inclined conveyor 304. For example, it may be necessary to advance slabs 350 to the pick-up position at a sufficient rate to ensure that the pick-up process has been completed in time for a next slab to be advanced onto stacking conveyor 302. This sufficient rate may require stacking head 303 to be moved backwards to ensure proper positioning for pick up.

More particularly, in some cases, the speed at which stacking conveyor 302 is advanced to position slabs under stacking head 303 may be too high in comparison to the speed of inclined conveyor 304. For example, if the difference between the speeds of the two conveyors is too large, the next slab may be damaged (e.g. ripped) as stacking conveyor 302 pulls it from inclined conveyor 304. To avoid this, stacking conveyor 302 can be advanced at a sufficient rate so that the slabs are removed by stacking head 303 prior to the next slab being advanced onto stacking conveyor 302. Once the slabs are removed, stacking conveyor 302 can be slowed down to an appropriate speed for advancing the next slab onto stacking conveyor 302. Therefore, this ability to move stacking head 303 to a different pick up position allows stacking conveyor 302 to be advanced at different rates even if a particular rate would advance slabs beyond the normal pick-up position.

Again using $T_{3a}$ and $T_{3b}$, $T_{3a}$ can represent the amount of time required to position sod at pick up position 312b while $T_{3b}$ can represent the amount of time required to position sod at pick up position 312a. With the value of $T_{3a}$ being set based on $T_2$ (or the amount of time required to stack sod at a farther stacking position), $T_{3b}$ will be lower than $T_2$ resulting in a decrease in the amount of time required to perform two stacking operations and an increase in the rate at which sod may be harvested. For example, if $T_{3a}$ is 3 seconds, $T_{3b}$ may be 2.95 seconds yielding approximately a 1% increase in yield.

Advancing Stacking Conveyor at Variable Speeds

In addition to or in place of the use of multiple pick up positions, the stacking conveyor can be advanced at variable speeds to increase the overall rate at which sod is removed from the stacking conveyor. Referring again to the different times ($T_1$ and $T_2$) that it takes a stacking head to complete a stacking operation, the speed at which the stacking conveyor is advanced can be increased so that the slower stacking operation (i.e. the stacking operation that requires $T_2$ seconds or the more distant stacking operation) can be commenced sooner which in turn will ensure that the stacking head can return to a pick up position sooner. If the stacking head returns to a pick up position sooner, the overall rate at which sod can be removed will be increased.

Advancing the stacking conveyor at variable speeds also allows $T_3$ to be reduced for some stacking operations. In other words, by selectively increasing the rate at which the stacking conveyor is advanced, sod will be ready for pick up in a slightly lower amount of time. The amount of time required to position sod in a pick up position when a slower rate is used to advance the stacking conveyor will be referred to as $T_{3c}$. Likewise, the amount of time required to position sod in a pick up position when a faster rate is used to advance the stacking conveyor will be referred to as $T_{3d}$. $T_{3d}$ will therefore be lower than $T_{3c}$. As with the use of multiple pick up locations, $T_{3c}$ can be set based on $T_2$ so that the amount of time required to perform two stacking operations ($T_{3c}+T_{3d}$) is less than $2T_3$.

FIGS. 4A-4D illustrate how a stacking conveyor 402 can be advanced at different rates based on where the next stacking position is. Although FIGS. 4A-4D are based on the slab accumulation technique disclosed in the '402 application, any technique which advances sod to a pick up position can be modified as described herein so that sod is advanced at different rates depending on where it will be stacked.

As is disclosed in the '402 application, a number of slabs can be accumulated at a front end of a stacking conveyor. Then, once the appropriate number of slabs have been accumulated, the stacking conveyor can be advanced so that the slabs are positioned in the appropriate pick up position to allow the stacking head to remove them from the stacking conveyor. As described above, the stacking head can travel to multiple different stacking positions with at least one of the stacking positions requiring a greater amount of time to reach than at least one other stacking position.

FIGS. 4A and 4B represent the case where the slabs are going to be stacked at a stacking position that requires more time to reach (and return) such as, for example, a farther stacking position. The stacking operation performed in FIGS. 4A and 4B can therefore represent $T_2$. FIGS. 4C and 4D, on the other hand, represent the case where the slabs are going to be stacked at a stacking position that requires less time to reach (and return) such as, for example, a nearer stacking position. The stacking operation performed in FIGS. 4C and 4D can therefore represent $T_1$. Other examples of stacking positions that may require more time to reach include rotated positions versus non-rotated positions. The techniques described herein can be employed regardless of why one stacking position may require more time to reach than another.

In FIG. 4A, three slabs of sod 450 have been accumulated at the front edge of stacking conveyor 402 and are therefore ready to be advanced to a pick up position. This time at which the slabs of sod are ready to be advanced to the pick up position is denoted as $t_0$ in the timeline. Because the slabs 450 are going to be stacked at a farther stacking position, stacking conveyor 402 can be advanced at a faster rate so that the slabs reach the pick up position at time $t_0+x$. Therefore, at time $t_0+x$, stacking head 403 can remove the slabs 450 from stacking conveyor 402 for stacking at the farther stacking position.

In contrast, FIGS. 4C and 4D (which are otherwise identical to FIGS. 4A and 4B) show that stacking conveyor 402 is advanced at a slower rate so that the slabs 451 reach the pick up position at a time $t_0+y$, where y is greater than x. Therefore, at time $t_0+y$, stacking head 403 can remove the slabs 451 from stacking conveyor 402 for stacking at the nearer stacking location.

Because x is lower than y, the stacking operation at the farther stacking location will be commenced sooner (with respect to the time at which the slabs are accumulated and ready to be advanced) than the stacking operation at the nearer stacking location. Because the stacking operation at the farther stacking location commences sooner, stacking head 403 will return to the pickup up position sooner than it otherwise would if stacking conveyor 402 had not been advanced at a faster rate. Therefore, stacking head 403 can be ready for the next stacking operation more quickly. As such, inclined conveyor 404 can be operated at a faster rate to deliver slabs to stacking conveyor 402 more quickly thereby increasing the rate at which sod can be harvested.

In other words, sod that is going to be stacked at the farther stacking position can be delivered to the pick up position in $T_{3d}$ seconds. Assuming $T_{3d}$ is 2.95 seconds and $T_1$ is 2 seconds, the stacking head can easily be in position to pick up the sod within the 2.95 seconds because it will be returning from the nearer stacking position. In contrast, sod that is going to be stacked at the nearer stacking position can be delivered to the pick up position in $T_{3c}$ seconds. Assuming $T_{3c}$ is 3 seconds and $T_2$ is 3 seconds, the stacking head will return from the farther stacking position just in time to pick up the sod.

By selectively advancing stacking conveyor 402 at a faster rate, performance can be increased without increasing power consumption and wear that would otherwise occur if the stacking conveyor were always advanced at the faster rate. For example, advancing the stacking conveyor at the faster rate when the slabs will be stacked at the nearer stacking position may not provide any performance increases since the stacking head may be able to return from the nearer stacking position in time regardless of the rate. For example, using the numbers from the previous paragraph, the stacking head can complete the stacking operation at the nearer stacking position in 2 seconds which is well within the 2.95 seconds that it will take until the sod is again ready to be picked up. Therefore, advancing the stacking conveyor at the faster rate in such cases may waste power and increase wear without any performance benefits. Accordingly, the present invention can increase harvesting yields in an efficient manner by only advancing the stacking conveyor at the faster rate when it will decrease the amount of time to perform a stacking operation.

Also, the present invention encompasses embodiments where the stacking conveyor is advanced at different rates and the stacking head employs multiple pick up positions. For example, in FIGS. 4C and 4D, stacking head 403, in contrast to what is shown, may be positioned at a different pick up position (e.g. pick up position 312b). In this way, after stacking at the farther stacking position, stacking head 403 may return to a pick up position further back on stacking conveyor 402 further increasing the rate at which inclined conveyor 404 can deliver sod to stacking conveyor 402.

In terms of $T_3$, $T_{3b}$ can be further reduced by advancing the stacking conveyor at a faster rate. For example, when picking up at pick up position 312a, the stacking conveyor can be advanced at the faster rate so that the pick up occurs sooner. Using the example numbers from above, $T_{3b}$ can be further reduced to 2.9 seconds by advancing the stacking conveyor at the faster rate. In such cases, $T_{3a}$ may remain 3 seconds to accommodate for the value of $T_2$ of 3 seconds.

In any of the described embodiments, various combinations of software and hardware can be employed to determine when to move the stacking head to a different pick up position, when to advance the stacking conveyor at a different rate, etc. For example, sensors may be employed to detect the position of the stacking head, the position of sod, or another factor that can be used to determine when or whether to implement the techniques described above.

Although the above description has used examples where only two stacking positions are employed, the described techniques can be employed when more than two stacking positions are used even if each stacking position requires a different amount of time to perform a stacking operation. In such cases, the pick up position and/or the rate at which the stacking conveyor is advanced can be controlled based on a particular stacking position.

Pivoting Stacking Head

Figure 5B:
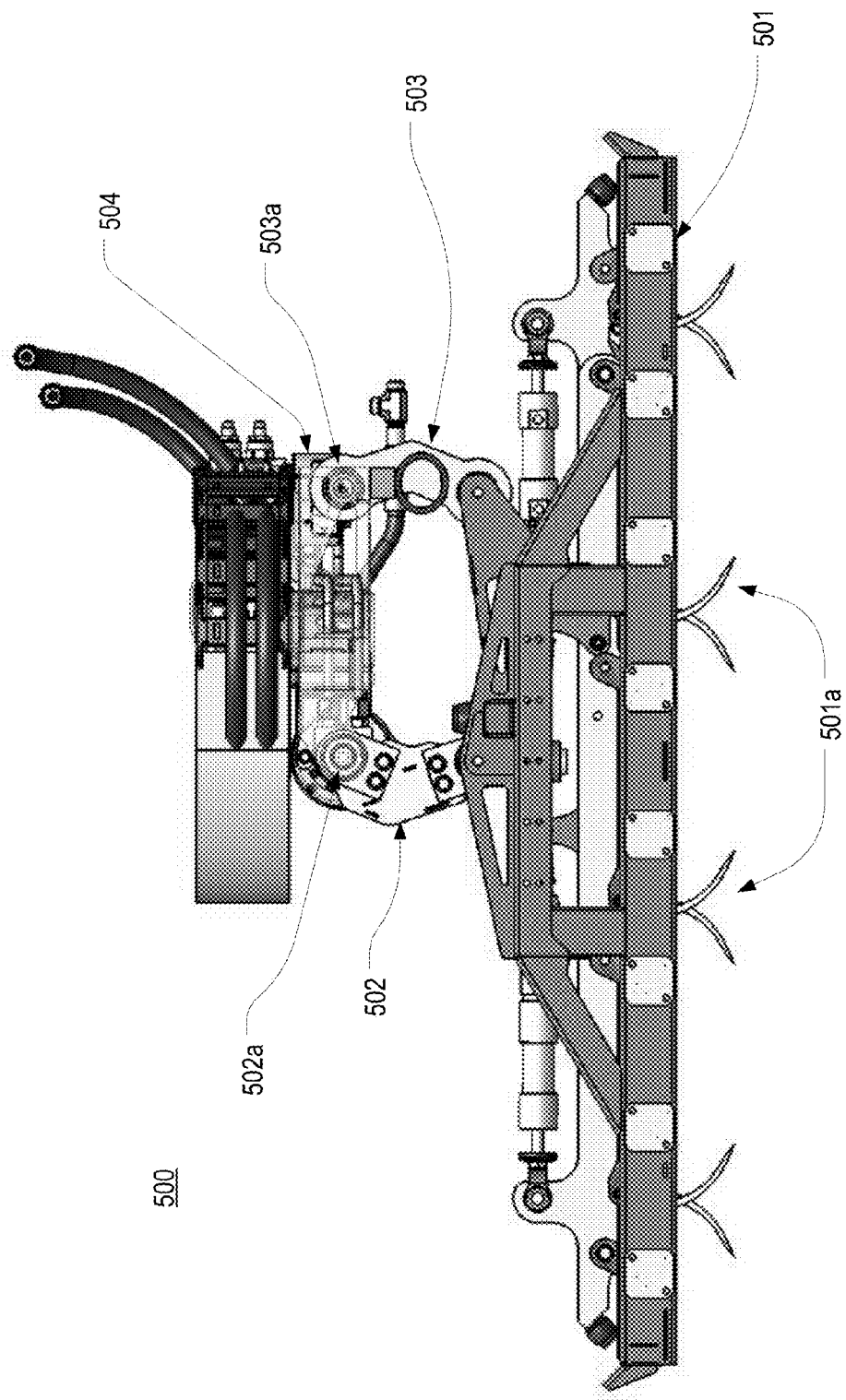
Figure 5C:
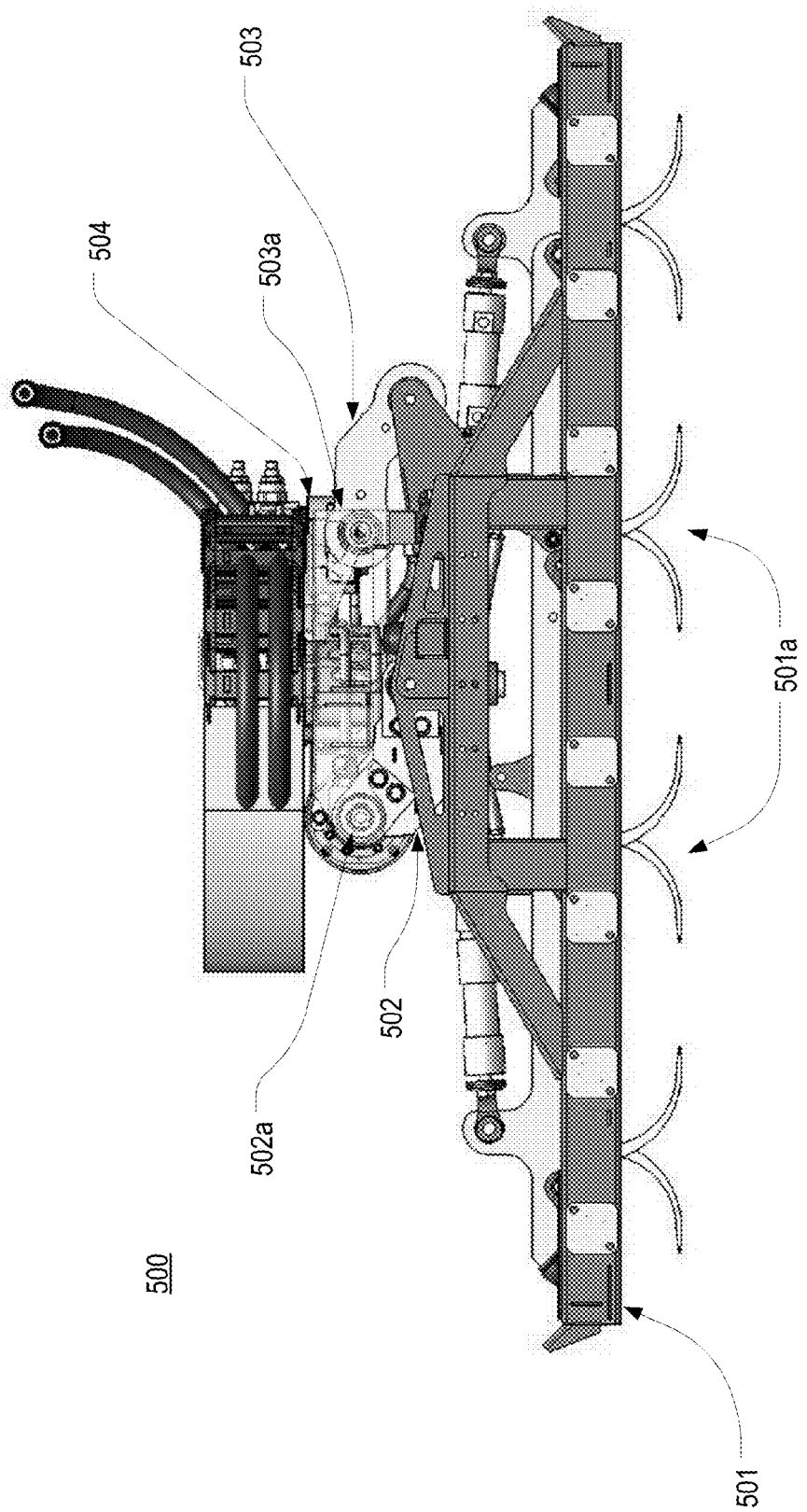

FIGS. 5A-5C illustrate a pivoting stacking head 500 that can be employed on a sod harvester. Pivoting stacking head 500 can, but is not required to, be used in conjunction with any of the above described techniques.

In preferred embodiments, pivoting stacking head 500 can be used when the stacking conveyor is not stopped to allow the stacking head to pick up sod. Pivoting stacking head 500 can therefore be used in the embodiments described in the '402 application.

Pivoting stacking head 500 comprises a main body portion 504 to which a sod securing portion 501 is connected via arms 502 and 503. Main body portion 504 can be configured to secure stacking head 500 to a support frame (not shown) along which stacking head 500 can traverse to move between a pick up position and a stacking position. Arms 502 and 503 are connected to main body portion 504 via pivoting connections 502a and 503a respectively. Similar pivoting connection may also be used between arms 502 and 503 and sod securing portion 501 to ensure that sod securing portion 501 remains substantially horizontal during movement.

Pivoting connections 502a and 503a allow sod securing portion 501 to be swung along an arc from a first position (shown in FIG. 5A) to a second position (shown in FIG. 5C). Sod securing portion 501 can be in the first position prior to picking up sod from a stacking conveyor. Then, as shown in FIG. 5B, sod securing portion 501 can be allowed to drop (or rotated via a motor) towards the stacking conveyor. Because of pivoting connections 502a and 503a, sod securing portion 501 will drop towards the stacking conveyor along an arc (e.g. following a downward and a rightward trajectory based on the orientation shown in FIGS. 5A-5C).

As sod securing portion 501 drops towards the stacking conveyor, hooks 501a (or other securing means) may extend to pierce or otherwise secure sod on the stacking conveyor to allow stacking head 500 to pick up the sod. Next, continued rotation about pivoting connections 502a and 503a cause sod securing portion 501 to elevate upward towards main body portion 504 to the second position thereby lifting the sod from the stacking conveyor. Hooks 501a remain extended until stacking head 500 travels to an appropriate stacking position where the hooks can be withdrawn releasing the sod.

Sod securing portion 501 can be configured to return to the first position prior to stacking the sod (e.g. immediately after removing sod from the stacking conveyor) or may stack the sod while in the second position and then return to the first position. In other embodiments, sod securing portion 501 can be configured to stack the sod in either the first or the second position.

Because of the swinging motion enabled by pivoting connections 502a and 503a, sod securing portion 501 can be moved between the first position and the second position using relatively little energy. In other words, the design of pivoting stacking head 500 can take advantage of gravity to perform a sod pick up operation. In some embodiments, pivoting connection 502a can include a motor for controlling the motion of sod securing portion 501. This motor can control when sod securing portion 501 is released from the first position and returned to the first position. The motor can also supply sufficient energy to ensure that sod securing portion 501 fully reaches each position. In embodiments where pivoting connection 502a includes a motor, pivoting connection 503a may not include a motor and may serve to provide stability. Alternatively, pivoting connection 503a may include a motor and pivoting connection 502a may serve to provide stability.

In some embodiments, the first position can be a forward position such that the movement of sod securing portion 501 from the first position to the second position is in the same direction as the movement of sod on the stacking conveyor. In such cases, sod would move from left to right along the stacking conveyor in the example shown in FIGS. 5A-5C. By moving in the same direction as the stacking conveyor, sod securing portion 501 can more efficiently remove sod from the stacking conveyor. For example, this movement with the stacking conveyor reduces the relative speed of the sod with respect to stacking head 500. This reduced relative speed facilitates removal of the sod even if the stacking conveyor is operating at relatively high speeds.

In some embodiments, in addition to the movement of sod securing portion 501 from the first position to the second position, main body portion 504 may also be configured to move in an opposite direction. In other words, while sod securing portion 501 swings from the first position to the second position, main body portion 504 (and as a result, sod securing portion 501) can move in an opposite direction. With reference to FIGS. 5A-5C, this opposite movement may be from right to left. The opposing movement of main body portion 504 can be employed to reduce the speed of sod securing portion 501 with respect to the stacking conveyor which may be desirable in some cases to smooth the overall operation of the stacking head.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester comprising:
   a support on which slabs of sod are stacked;
   a stacking conveyor positioned adjacent to the support and configured to support one or more slabs of sod prior to a stacking operation, the stacking conveyor configured to rotate in a first direction to advance the one or more slabs of sod to a pick up location; and
   a stacking head configured to travel between a pick up position that is above the pick up location and a plurality of stacking positions overtop the support, the plurality of stacking positions including a first stacking position and a second stacking position, a distance between the pick up position and the first stacking position being less than a distance between the pick up position and the second stacking position, the stacking head being configured to remove the one or more slabs of sod from the stacking conveyor while the stacking head is in the pick up position and to release the one or more slabs of sod onto the support while in one of the plurality of stacking positions;

wherein the sod harvester is configured to cause the stacking conveyor to advance the one or more slabs of sod to the pick up location at a first rate when the stacking head will stack the one or more slabs in the first position and at a second rate when the stacking head will stack the one or more slabs in the second position, the second rate being faster than the first rate.

2. The sod harvester of claim 1, wherein the stacking head is configured to rotate when travelling to one or both of the first or second stacking positions.

3. The sod harvester of claim 1, wherein the stacking head travels from the pick up position to the first and second stacking positions in a direction that is substantially perpendicular to the first direction.

4. The sod harvester of claim 3, wherein the pick up position comprises at least two pick up positions with a first pick up position being closer to a front of the stacking conveyor than a second pick up position, and wherein the stacking head is positioned at the first pick up position when the stacking conveyor is advanced at the second rate.

5. The sod harvester of claim 1, wherein the stacking head includes a pivoting connection that allows at least a portion of the stacking head to descend along an arc to remove the one or more slabs of sod from the stacking conveyor.

6. A method of operating a stacking head of a sod harvester, the method comprising:
continuously operating one or more inclined conveyors to deliver slabs of sod to the stacking conveyor at a periodic rate;
while slabs of sod are being delivered to the stacking conveyor at the periodic rate, operating the stacking head to remove sets of one or more slabs of sod from the stacking conveyor, the stacking head being configured to remove the sets from the stacking conveyor in at least a first and a second pick up position and to stack the sets in at least a first and a second stacking position, the first pick up position being closer to a front of the stacking conveyor than the second pick up position, the first stacking position being closer to the stacking conveyor than the second stacking position, operating the stacking head comprising:
positioning the stacking head at the first pick up position to enable the stacking head to remove a first set of one or more slabs of sod from the stacking conveyor;
moving the stacking head from the first pick up position to the second stacking position to enable the stacking head to stack the first set;
after returning from the second stacking position, positioning the stacking head at the second pick up position to enable the stacking head to remove a second set of one or more slabs of sod from the stacking conveyor;
moving the stacking head from the second pick up position to the first stacking position to enable the stacking head to stack the second set; and
after returning from the first stacking position, positioning the stacking head at the first pick up position.

7. The method of claim 6, wherein the stacking head is moved to the first stacking position and to the second stacking position at substantially the same speed.

8. The method of claim 6, wherein the sets comprise a plurality of slabs that are accumulated on the stacking conveyor.

9. The method of claim 6, wherein the second pick up position is dynamically determined.

10. The method of claim 6, further comprising:
operating the stacking conveyor at a first rate to advance the first set to a first pick up location under the first pick up position; and
operating the stacking conveyor at a second rate to advance the second set of sod to a second pick up location under the second pick up position, the first rate being faster than the second rate.

11. A stacking head of a sod harvester comprising:
a main body portion;
a sod securing portion configured to remove sod from a stacking conveyor; and
at least one arm that secures the sod securing portion to the main body portion via a pivoting connection such that the sod securing portion is configured to rotate from a first position to a second position around the pivoting connection, the sod securing portion including extending means that extend downwardly from the sod securing portion during the rotation from the first position to the second position to bypass the sod such that the sod is removed from the stacking conveyor as the sod securing portion continues rotating into the second position.

12. The stacking head of claim 11, wherein the first position is closer to a front of the stacking conveyor than the second position.

13. The stacking head of claim 12, wherein the main body portion is configured to move in a horizontal direction towards the front of the stacking conveyor while the sod securing portion rotates from the first position to the second position.

14. The stacking head of claim 11, wherein the sod securing portion rotates back from the second position to the first position prior to stacking the sod.

15. The stacking head of claim 11, wherein the stacking head is configured to remove sod from the stacking conveyor in at least two pick up positions with a first pick up position being closer to a front of the stacking conveyor than a second pick up position.

16. The stacking head of claim 15, wherein the stacking head is configured to stack sod in at least a first stacking position and a second stacking position, and wherein the second stacking position is farther from the stacking conveyor than to first stacking position, and wherein the stacking head is positioned in the second pick up position after stacking sod at the second stacking position.

* * * * *